F. E. THOMPSON.
HEADLIGHT CONTROLLER.
APPLICATION FILED MAR. 2, 1911.
1,021,279.
Patented Mar. 26, 1912.
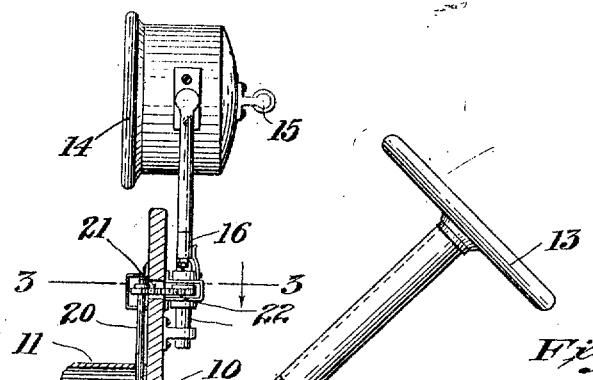
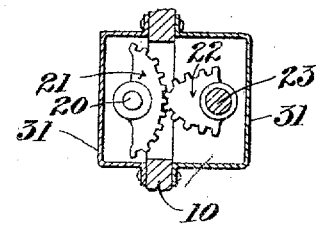
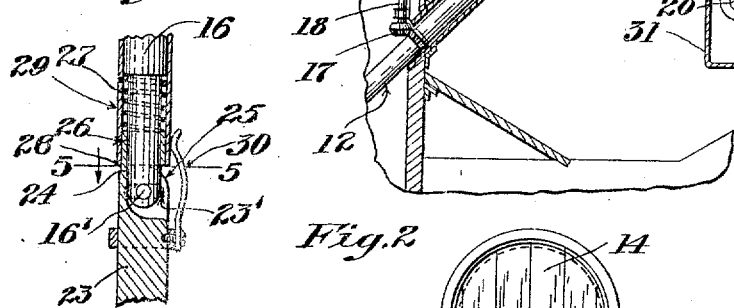
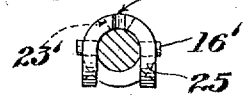
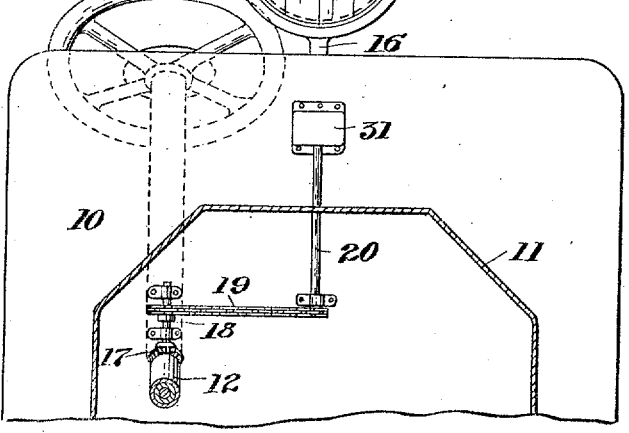
Witnesses:
Inventor,
Francis E. Thompson,
by his attorneys,
Mitchell, Chadwick & Kent

UNITED STATES PATENT OFFICE.

FRANCIS E. THOMPSON, OF ARLINGTON, MASSACHUSETTS.

HEADLIGHT-CONTROLLER.

1,021,279. Specification of Letters Patent. Patented Mar. 26, 1912.

Application filed March 2, 1911. Serial No. 611,782.

*To all whom it may concern:*

Be it known that I, FRANCIS E. THOMPSON, a citizen of the United States, residing at Arlington, in the county of Middlesex and State of Massachusetts, have invented new and useful Improvements in Headlight-Controllers, of which the following is a specification.

This invention relates to search lights for automobiles.

More particularly it relates to means for mounting and controlling such lights.

The object of the invention is to provide means by which a single search light may be employed for illuminating the road in front, automatically throwing the illumination to either side according to the changes in direction of the forward wheels, and for throwing the illumination at the will of the driver in any other direction, as, for example, upon a signboard at the side of the road; and, in cases where the forward wheels are turned to an extreme degree, automatically throwing the illumination to a still greater degree than that to which the wheels are turned, so as to illuminate the ground to which the wheels are leading the car more perfectly than is the case when the turning of the light is the same as that of the wheels. These objects are attained by the means hereinafter described, reference being had to the drawings, which illustrate one embodiment of the invention.

In the drawings, Figure 1 is a side elevation, partly in section. Fig. 2 is a front elevation; Fig. 3 is a plan, on an enlarged scale, on the line 3—3 of Fig. 1; Fig. 4 is a vertical elevation, in section, of a detail, on a large scale; and Fig. 5 is a plan in section on the line 5—5 of Fig. 4.

In the drawings, a portion of an automobile body is represented, in which the dashboard is marked 10, the hood over the engine 11, the steering shaft 12, and the steering wheel 13. These parts may be of any suitable or desired type. The search light, which also may be of any desired type, is marked 14, and has a handle 15 by which the light may be projected in various directions at will, under circumstances hereinafter defined. The light is supported on a shaft 16 which is, by intervening mechanism, connected with the steering shaft 12. This mechanism, as represented, consists of bevel gears 17 by which any movement of the steering wheel 13 is communicated to a short auxiliary shaft 18, whence it is communicated by a sprocket chain 19 to a shaft 20, the extent of movement of shaft 20 being in accordance with the extent of turning of the steering wheel 13. On this shaft 20 is an elliptical segmental gear 21 which meshes with an elliptical segmental gear 22, which, under certain circumstances, is connected with the shaft 16 that turns the search light. This second segment is mounted on a jack shaft 23 to which the shaft 16 that carries the light is joined. The junction is effected in the peculiar manner seen in Fig. 4, where the upper end of the shaft 23 is seen to be hollowed so that it can receive the lower end of shaft 16 which, at that point, is reduced in size. This is also seen in Fig. 5; and by comparing these two figures, the arrangement of pin 16' on shaft 16, which rides in the horizontal slot 23' in the upper part of shaft 23, is clearly seen. The top of shaft 23 is formed with a notch 24, which is preferably in front, as indicated; and the top of the shaft on the rear side is cut away as indicated at 25, in Figs. 4 and 5.

The shaft 16 carries a sleeve 26 keyed upon it, which is normally pressed downward by spring 27, and which has a projecting tooth 28 adapted to engage in the notch 24 of the jack shaft 23, locking the shaft 16 and 23 together when thus engaged, so that any rotation of shaft 23 causes shaft 16 to rotate a like amount. The shell tube 29 may conveniently be provided for housing the parts last described.

A spring, one form of which is illustrated in Figs. 1 and 4, is provided, which, being anchored on the shaft 23 and pressing against the shaft 16 or shell 29 surrounding it, maintains that shaft 16 normally forward, in the position illustrated, with its single tooth 28 engaged in the single notch 24 of the jack shaft.

All of the parts may conveniently be supported on the dashboard, as illustrated; the lamp being placed on the driver's side and an aperture cut through the dashboard, in which the elliptical gears play, protected by a housing 31. The shaft 20 and its connections to the steering column are conveniently placed on the forward side of the dashboard where they are protected by the hood 11.

In operation, in normal running, every movement of the steering wheels turns the shaft 20 and, therefore, the shaft 16 and lamp 14, in the same direction in which the wheels are turned. For ordinary running along the road, it is desired to have the light illumine the road some distance in advance; and since the beam of light broadens as the distance increases, all needs are adequately served by a relatively slight turning of the lamp when the wheels are turned, as in going from one side of the road to the other, without materially removing the illumination from the whole road in front. When a right angled, or other corner, of considerable angle, is to be turned, or a turning of the automobile around to face in the opposite direction, the considerable turn of the steering wheels gives the forward end of the car such relatively rapid lateral motion that the car may quickly travel out of the zone which is illuminated, if the light be turned only as much as the wheels are turned. The purpose of the part of the invention now being described is to provide means for automatically illuminating the ground upon which the car is about to enter when it is thus turning rapidly to either side. This is accomplished by means of the elliptical segments. When the wheel 13 is turned considerably, thus turning shaft 20 proportionately, those teeth of gear 21 which are at a greater distance from its center come into action; and at the same time those teeth of gear 22 which are nearer its center come into action; so that the ratio of the gearing from wheel 13 to light 14 is changed, the light being turned farther for each degree of turning of the steering wheel when that wheel has already been turned somewhat, than it is when that wheel is in or near its normal position for running straight ahead. Consequently, the beam thrown by the light turns in advance of the turning of the forward wheels, illuminating the ground upon which they are about to lead the car. By designing the elliptical segments with due regard to the gearing between the steering wheel and front wheels found in the particular car to which the invention is to be applied, the degree which this zone of illumination laterally precedes the front wheels may be fixed at pleasure.

The construction described is capable of adaptation to another use, which some drivers may consider even more important than that just described. By transposing the position of the segmental elliptical gears 21 and 22, the result will be that a slight turning of the car-steering mechanism from the normal will turn the light a greater degree. This will enable a driver to illumine the side of a road while proceeding along it, the slight deviation of steering incidentally involved being not more than can be readily compassed while proceeding at ordinary speed. To use the light for illuminating an object in some other direction, as, for example, the name on a signboard beside the road, which would not come within the scope of road illumination, the separable connection, with a one-toothed lock or mesh between shafts 16 and 23, is made. The driver, grasping handle 15, pulls it backward a little, in which case the lamp and shaft 16 swing backward on 16′ as a pivot. This leaves the tooth 28 out of mesh with the notch 24 on shaft 23; and shaft 16 is then free to be turned at will to the right or left, to the full scope of slot 23′. When the particular object has been accomplished, it is necessary to return the lamp to its connection for automatic operation. If the disconnection between the shafts had been made, as might be done, by throwing gears out of mesh, instead of using the described construction, it would be uncertain whether they would come together in the same mesh from which they separated. It is herein provided that the gears 21 and 22 and the other gears, remain always in mesh; and a separate disconnecting means is provided in which there is a single tooth and a single notch. Having disconnected the lamp and turned it to any desired degree by hand, the operator swings it again to its upright position, aided by the spring 30, and then turns it about until the tooth 28 falls into the notch 24. As there is but one tooth and one notch, the connection thus reëstablished is precisely like the connection which was broken; and the automatic operation of the light will be resumed in perfect register. When the shaft 16 is tilted backward, the sleeve 26 rides on the cut-away surface 25 at the top of shaft 23, so that its tooth 28 is lifted and held out of the notch 24. The sleeve 26 may rise, compressing its spring 27, as much as is necessary, the spring forcing the sleeve back so that the tooth is ready to reënter its notch when they register.

I claim:

1. A device for mounting and controlling headlights, comprising a steering shaft; a vertical lamp shifting shaft; connections between the steering shaft and the lamp shifting shaft; a second vertical shaft carrying the lamp above and in alinement with the lamp shifting shaft; a one point separable connection between the two shafts, and manually operated means to disconnect and swing the lamp carrying shaft at will and reëstablish the original connection.

2. A device for mounting and controlling headlights, comprising connections between the headlight and the car steering wheel, said connections including a pair of elliptical gears in mesh, one of which is actuated by the steering wheel and has a smaller radius than the driven gear at normal position, progressively increasing as the gear is turned, to cause the lamp to be turned slowly at the outset and rapidly as the steering wheel is turned for a large angled turn of the car.

Signed by me at Boston, Massachusetts, this 21st day of January, 1911.

FRANCIS E. THOMPSON.

Witnesses:
JOSEPH T. BRENNAN,
MARY A. O'BRIEN.